(No Model.) 3 Sheets—Sheet 1.
W. J. TANNER.
APPARATUS FOR WASHING AND SEPARATING GOLD AND SILVER FROM THEIR ORES.
No. 285,523. Patented Sept. 25, 1883.
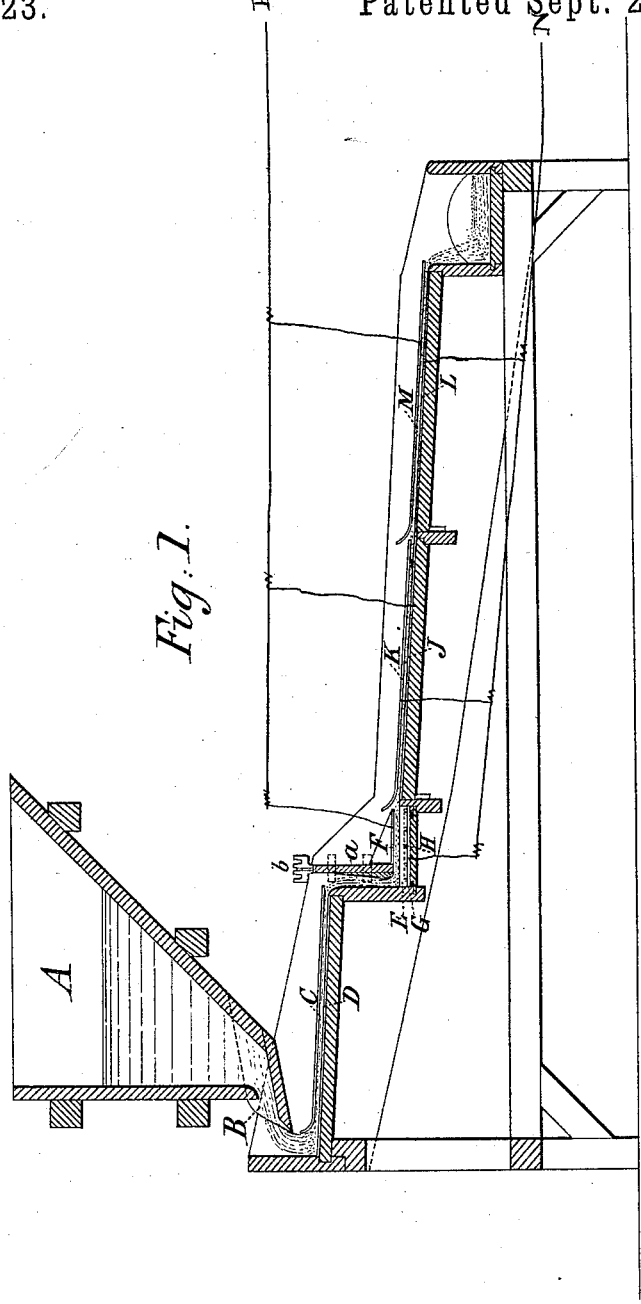

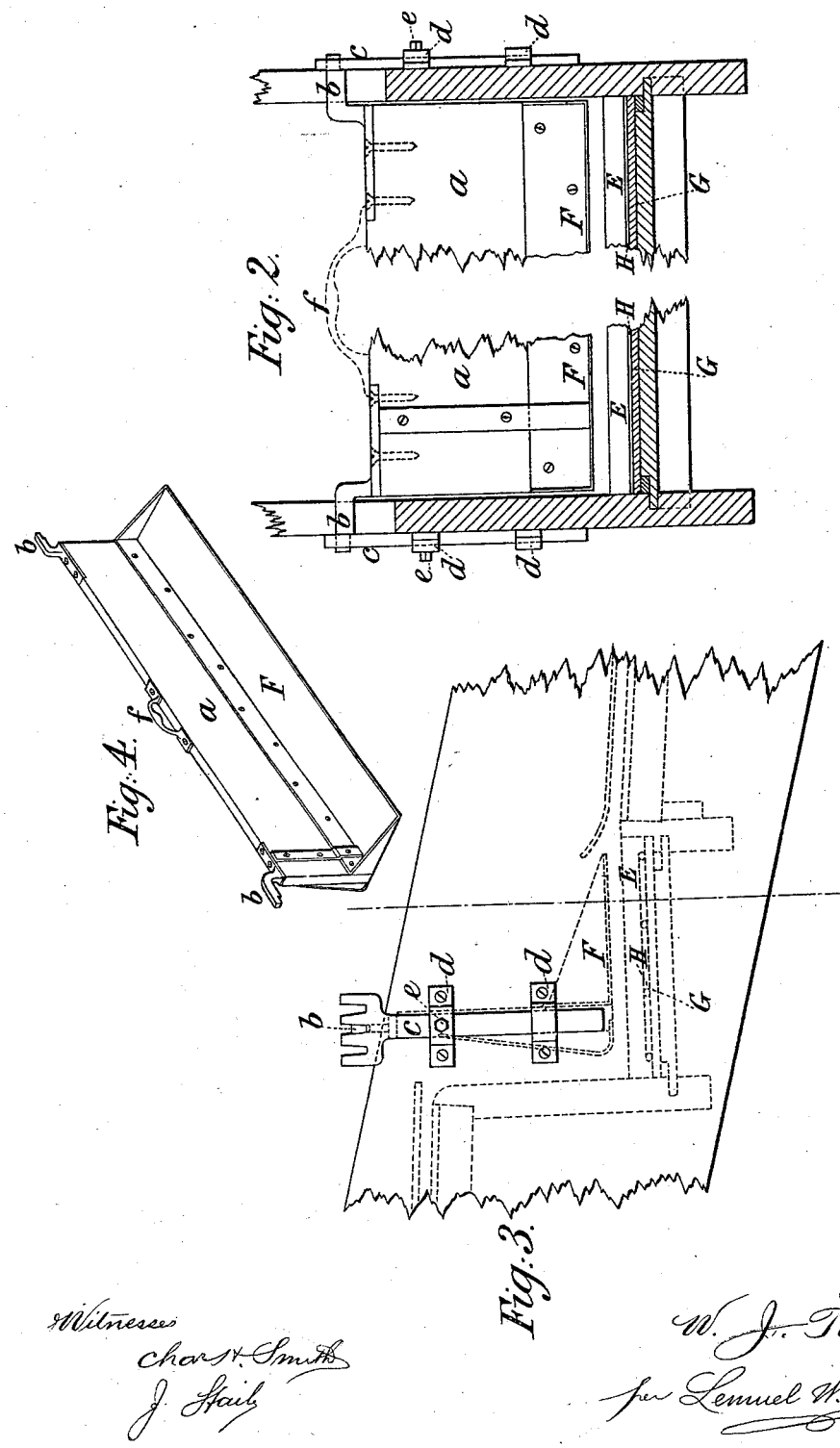

(No Model.) 3 Sheets—Sheet 3.
W. J. TANNER.
APPARATUS FOR WASHING AND SEPARATING GOLD AND SILVER FROM THEIR ORES.
No. 285,523. Patented Sept. 25, 1883.
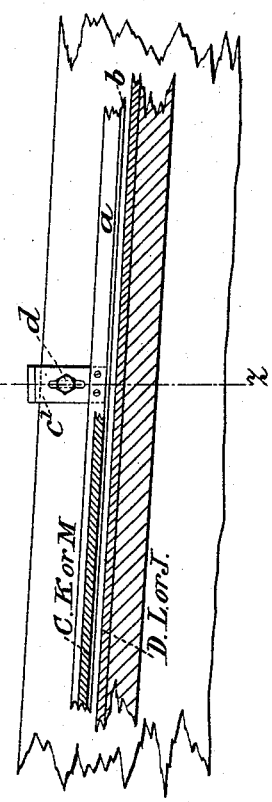
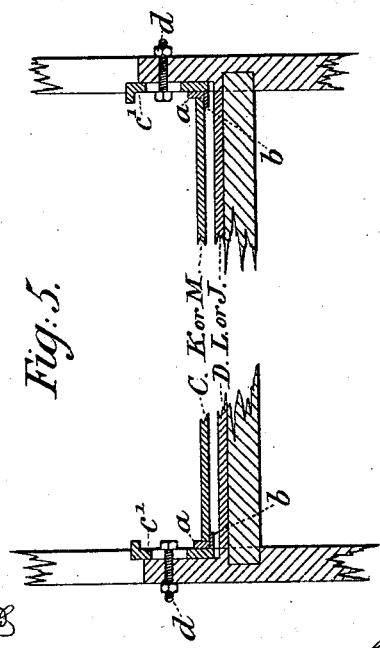
Witnesses
Chas. H. Smith
J. Hail
Inventor
W. J. Tanner
per Lemuel W. Serrell
atty

UNITED STATES PATENT OFFICE.

WILLIAM J. TANNER, OF LONDON, COUNTY OF MIDDLESEX, ENGLAND.

APPARATUS FOR WASHING AND SEPARATING GOLD AND SILVER FROM THEIR ORES.

SPECIFICATION forming part of Letters Patent No. 285,523, dated September 25, 1883.

Application filed April 14, 1883. (No model.)

*To all whom it may concern:*

Be it known that I, WILLIAM JOHN TANNER, a subject of the Queen of Great Britain and Ireland, residing at London, in the county of Middlesex, England, have invented certain new and useful Improvements in Apparatus for Washing and Separating Gold and Silver from their Ores, of which the following is a specification.

It is well known that in washing ores containing gold and silver in the ordinary manner some of the particles of the gold and silver sink by gravitation and others float on the surface of the water. It is also well known that certain metallic ores are repelled from the positive pole of an electric battery and are attracted to the negative pole of the same. Now, for washing and separating ores containing gold and silver, over amalgam-plates according to my invention, I construct and arrange apparatus in such a manner that one of the amalgam-plates is above or over the other, and the water containing the crushed ore passes between them—viz., over one plate and under the other; and if the surfaces of these plates between which the water containing the metallic ore passes be made amalgam-plates and both brought into contact with the water, the lower plate will catch the heavy gold and the upper plate the float gold, which is on or near the surface of the water. To amalgam-plates I apply a current of electricity in the following manner: In order to attract the float gold, the upper plate is made an amalgam-plate, its amalgamated face touching the water, and to such plate I attach the negative pole of a battery or other source of electricity, while I attach the positive pole of the said battery or other source of electricity, to plates or strips of copper, or other suitable conductor of electricity. These plates or strips of copper are arranged in such a manner as to allow the water to pass over them, so that the electric current is maintained from the positive to the negative pole by means of the stratum of water; but the amalgam-plate and the copper plate, strip, or the like must never come in contact with each other; otherwise the operation would be destroyed. To apply the electricity to an amalgam-plate over which the water runs, the strips or plates of copper, or other suitable conductors of electricity, are placed over the amalgam-plate. To this amalgam-plate the negative pole of the battery or other source of electricity is attached, and to the strips or plates of copper the positive pole is attached, the electric current being maintained between the negative and positive poles by means of the stratum of water which is in contact with both the poles; but the amalgam-plates must never come into contact with the strips or plates of copper or the like, for the reason as before stated.

My invention will be readily understood on reference to the accompanying drawings, which represent an apparatus constructed in accordance therewith.

Figure 1 is a longitudinal section of my improved apparatus; Fig. 2, a transverse section of a riffle or bath, on a larger scale. Fig. 3 shows in fragmentary view an arrangement for raising and lowering the copper plate (anode) shown in detached view, Fig. 4. Figs. 5 and 6 are sections showing the arrangement for raising and lowering the plates under which the water and ore pass, Fig. 5 being taken on the line *z z* of Fig. 6.

A is a hopper, in which the ground metallic ore is placed with the necessary amount of water. From this hopper the ore passes out at the spout B and flows between the two amalgam-plates C and D, the plate C being covered with amalgam on its lower face and the plate D with amalgam on its upper face. The ore, after passing between these plates, falls upon or into a riffle or bath containing mercury E, over which a plate of copper, F, is placed, and so arranged that the water and the ore contained therein pass over the mercury and under the copper plate. This plate is rendered adjustable by the means hereinafter described, so as to be capable of being raised or lowered, in order to regulate the flow of the water. In the riffle or bath at the bottom of the mercury I place a sheet of glass, G, or some equally smooth surface, preferably a non-conductor of electricity, to prevent the loss of small particles of gold or silver amalgam, and on this sheet of glass I place copper bands, wires, or the like, H, which may be undulated, serrated, or coiled, in order to increase their surface. To these copper bands, wires, or the like, on which the mercury lies, the negative pole of a battery or other source of electricity is attached, and to the copper plate F the positive pole is attached. After the ore has passed over the mercury in the riffle it passes over the plates or strips of copper or other suitable conductors of electricity, J, and under the amalgam-plate K, which is amalgamated on its lower face. To the strips or plates of copper J, I attach the positive pole of a battery or other source of electricity, and to the amalgam-plate K, I attach the negative pole of such battery, the water containing the ore passing between and touching both the amalgam-plate K and the strips or plates of copper J. I make the amalgam-plate K adjustable, so as to regulate the flow of the water. The ore then passes over another amalgam-plate, L, and under strips or plates of copper M. To the amalgam-plate L, I attach the negative pole of a battery or other source of electricity, and to the copper plates, strips, &c., M, I attach the positive pole of a battery or other source of electricity.

The object of making the electric connections alternately to top and bottom plates of the sluice is to cause the current to flow toward the amalgam-plates, in order that the particles of precious metal may be carried by the electric current both up and down, and be brought into contact with such amalgam-plates. By this arrangement, in the first series, the ore passes between two amalgam-plates, and in the second series over a riffle containing mercury, while in the third series it passes under an amalgam-plate, to which electricity is applied in order to attract all the particles of light and float gold or silver which may be on or near the surface of the water, thus causing the amalgam-plate to act like a magnet on such particles. The fourth series is the reverse of the third series, and is used to attract the heavier particles.

In order to regulate the flow of water and to insure contact between the water and the plates of copper, or the like, under which the water containing the metallic ore passes, I make such copper plates or the like adjustable in the following manner, and as shown in Figs. 2, 3, 4, and 5:

Figs. 2 and 3 show a means of raising or lowering the copper plate F above the mercury E. The copper plate F is fastened to a backing, a, of wood or other suitable material, and at the two upper corners of this backing are fastened hangers b b, one at each end. These hangers drop into notches at the top of the bearings c c, one of which is placed at each side of the apparatus. These bearings c c are capable of being raised or lowered in the guides d d, and after being set at the required distance between the copper plate F and the mercury E may be kept in their places by the set-screws e e. The backing a a, together with the copper plate F, which is fastened to it, can be removed from the apparatus by the handle f.

Figs. 5 and 6 show a means of raising or lowering the plates C, K, or M. a is a strip of wood or other material having a ledge, b, on which the plates C, K, or M can be laid. This strip of wood a is fastened to a slotted piece of metal, c', which slides in a groove cut in the side of the frame-work of the apparatus, and can be raised or lowered, together with the plate which is laid thereon, to the desired distance above the plates D, L, or J, and fixed in position by tightening the nut on the bolt d, which passes through the slot in the piece of metal and through the side of the apparatus.

I wish it to be understood that I do not bind myself to any particular number of plates, bands, and riffles or baths, nor to apply them in combination or order as shown, as either of the series may be used separately; nor do I claim, broadly, the use of amalgam-plates in apparatus for washing and separating gold and silver from their ores, as I am aware that such amalgam-plates have been used prior to the date of my invention; but What I do claim, and desire to secure by Letters Patent, is—

1. In an apparatus for washing and separating gold and silver from their ores, the combination, with the hopper A, of the amalgam-plates C D, the riffle or bath, constructed substantially as described, the amalgam-plates K L, and copper plates J M, and the electric connections to the same and to the riffle, substantially as set forth.

2. In an apparatus for washing and separating gold and silver from their ores, the combination, with the means for supplying ore and water, of a riffle or bath containing mercury and composed of a sheet of glass, G, upon the bottom of said riffle, a copper form or wires, H, upon the glass, and a plate of copper, F, above the mercury and out of contact with it, and electrical connections to said wires H and plate F, respectively, substantially as and for the purposes set forth.

3. A riffle or bath for separating gold and silver from their ores, composed of a trough containing mercury, upon the bottom of which is a plate of glass, G, and a copper form or wires, H, with electrical connections to the negative pole of a battery, and a copper plate, F, connected electrically with the positive pole of a battery, and secured to a backing, a, and suspended by hangers b b in adjustable bearings c c in the side frames of the apparatus, for the purposes substantially as set forth.

4. A riffle or bath for separating gold and silver from their ores, composed of a trough containing mercury, upon the bottom of which is a plate of glass, G, and a copper form or wires, H, and a copper plate, F, and electrical connections from said wires H and plate F to the positive and negative poles of a battery, respectively, and with mechanism for raising and lowering said plate F, substantially as set forth.

5. In an apparatus for washing and separating gold and silver from their ores, the combination, with the upper plates, C K M, of frames for carrying the same, and adjustable hangers for carrying said frames, and bolts for securing the hangers to the side frames of the apparatus, substantially as specified.

6. In an apparatus for washing and separating gold and silver from their ores, the combination, with means for supplying ore and water, of pairs of opposing plates, between which the ore and water pass, one plate of each pair having an amalgam surface, the amalgam-plates being alternately beneath and above, and electrical connections to the respective poles of a battery, for retaining both heavy and light or float metal, substantially as specified.

In witness whereof I have hereunto signed my name in presence of two subscribing witnesses.

WILLIAM JOHN TANNER.

Witnesses:
 WILLIAM LEE,
  68 *Fleet Street, London,*
 G. W. WESTLERY,
  17 *Gracechurch St., London.*